(12) United States Patent
Filip

(10) Patent No.: US 8,012,053 B2
(45) Date of Patent: Sep. 6, 2011

(54) COMBINATION DUST COVER AND BEARING RETENTION MEMBER

(75) Inventor: Ethan L. Filip, Battlefield, MO (US)

(73) Assignee: Dayco Products, LLC, Tulsa, OK (US)

( * ) Notice: Subject to any disclaimer, the term of this patent is extended or adjusted under 35 U.S.C. 154(b) by 869 days.

(21) Appl. No.: 11/238,961

(22) Filed: Sep. 29, 2005

(65) Prior Publication Data

US 2007/0072714 A1    Mar. 29, 2007

(51) Int. Cl.
F16H 55/36 (2006.01)
F16D 1/00 (2006.01)
B62J 13/00 (2006.01)

(52) U.S. Cl. ............ 474/144; 474/49; 474/70; 474/199

(58) Field of Classification Search ............ 474/49, 474/144; 384/489, 539, 903
See application file for complete search history.

(56) References Cited

U.S. PATENT DOCUMENTS

| | | | |
|---|---|---|---|
| 2,655,814 A | | 10/1953 | Holm |
| 3,656,825 A | * | 4/1972 | Manger ........................ 384/561 |
| 3,770,992 A | * | 11/1973 | Veglia ........................... 384/489 |
| 3,941,396 A | | 3/1976 | Bailey et al. |
| 4,025,132 A | * | 5/1977 | Watanabe ..................... 384/130 |
| 4,113,328 A | | 9/1978 | Vander Meulen |
| 4,228,881 A | * | 10/1980 | Nakamura ...................... 192/98 |
| 4,304,416 A | | 12/1981 | Oshima |
| 4,602,875 A | | 7/1986 | Doerr et al. |
| 4,863,293 A | | 9/1989 | Sytsma |
| 5,725,448 A | | 3/1998 | Kato et al. |
| 5,848,814 A | | 12/1998 | Nadasky et al. |
| 6,267,416 B1 | | 7/2001 | Ferreira et al. |
| 6,293,885 B1 | | 9/2001 | Serkh et al. |
| 6,663,521 B2 | * | 12/2003 | Uryu et al. ...................... 474/70 |
| 6,676,548 B2 | * | 1/2004 | Fujiwara ........................ 474/70 |
| 6,699,149 B1 | | 3/2004 | White et al. |
| 6,872,005 B2 | * | 3/2005 | Steinebach .................... 384/489 |
| 2001/0045784 A1 | * | 11/2001 | Niimi et al. ..................... 310/85 |
| 2003/0103701 A1 | * | 6/2003 | Steinebach .................... 384/489 |
| 2004/0005102 A1 | * | 1/2004 | Schmidt ........................ 384/477 |

OTHER PUBLICATIONS

PCT, International Search Report, International Application No. PCT/US06/36448 (mailed Feb. 20, 2007; published Apr. 12, 2007).
PCT, International Preliminary Report on Patentability, International Application No. PCT/US06/36448 (Sep. 19, 2007).

* cited by examiner

*Primary Examiner* — Michael Mansen
*Assistant Examiner* — Robert Reese
(74) *Attorney, Agent, or Firm* — Thompson Hine LLP

(57) ABSTRACT

A rotatable device, such as a pulley, includes an annular rotatable member having a bore extending therethrough and an outer surface disposed about the bore. A bearing is located in the bore. The bearing is operably connected to the annular rotatable member to form an axis of rotation about which the annular rotatable member can rotate relative to an inner race of the bearing. A combination dust cover and bearing retaining member spans the bore at a location spaced axially from the bearing. The cover includes a flange received by a groove extending outwardly from the bore in a direction toward the outer surface of the rotatable member to attach the combination dust cover and bearing retaining member to the rotatable member.

22 Claims, 7 Drawing Sheets

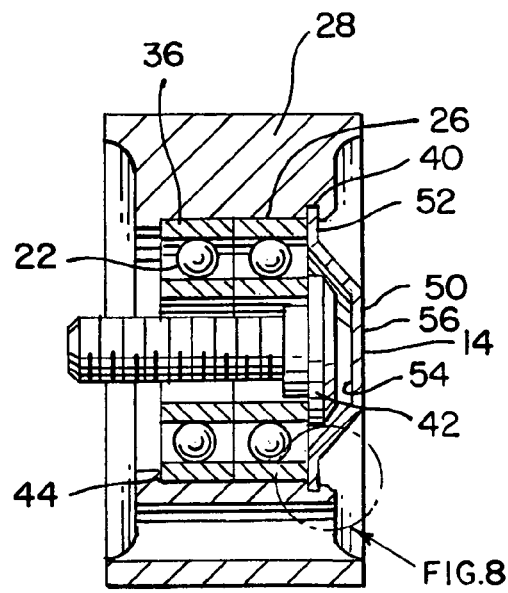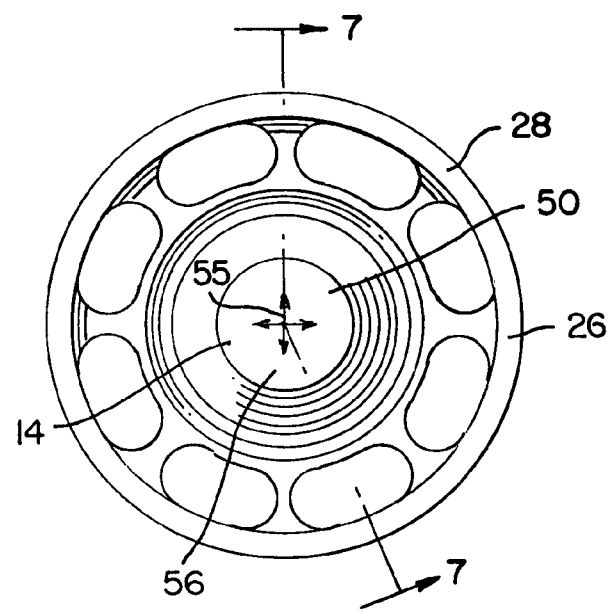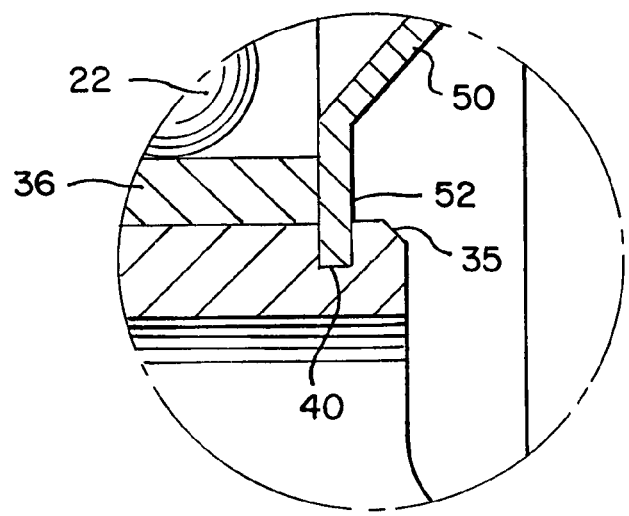

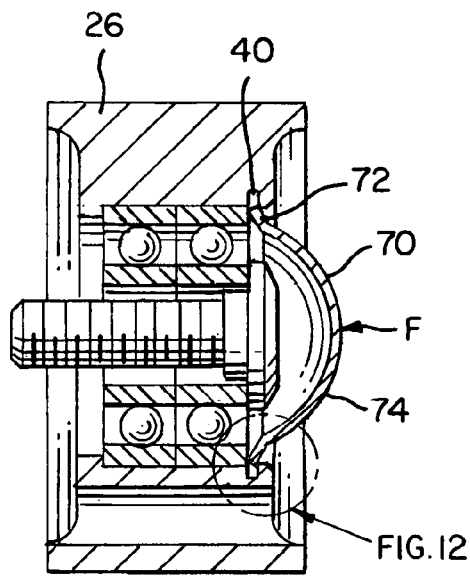
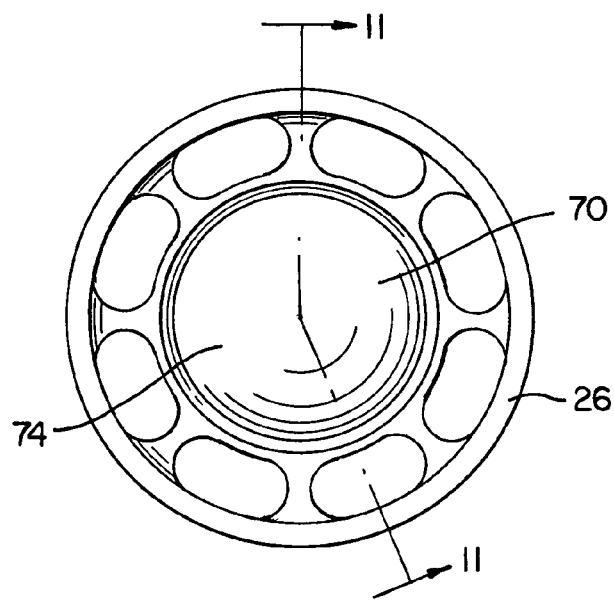
FIG. 11     FIG. 10
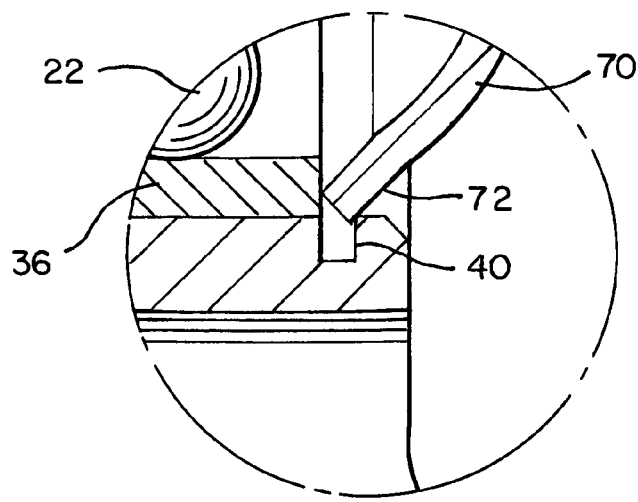
FIG. 12

COMBINATION DUST COVER AND BEARING RETENTION MEMBER

TECHNICAL FIELD

The present application relates generally to rotatable systems and more particularly to a dust cover that also serves as a bearing retention member for a rotatable system.

BACKGROUND

Idler pulleys are often used with timing belts or drive belts that may be used to transmit power. This can be accomplished by using a driver pulley and one or more idler pulleys. Idler pulleys are used as a component of a belt tensioner to change the direction of the belt or to maintain belt tension. In some instances, the pulley may serve as a wheel, gear, roller or the like.

Idler pulleys generally include a pulley shell or body having a belt-engaging surface and one or more bearings. The pulley shell may be mounted to a surface or tensioner arm of the belt tensioner. The pulley shell is rotatably connected to the tensioner arm by the bearing seated within the pulley shell. A belt is then trained around the belt surface of the pulley shell. The belt surface may be smooth, deep V-shaped, cogged or multi-ribbed, as examples. Generally, the pulley shell and the mounting surface contain an aperture shaped to engage a fastener, such as a bolt to provide clamping force and to aid in securing components of the belt tensioner together. The fastener is inserted through the bearing and the pulley shell into the mounting surface.

It is often desirable to secure the bearing in place to inhibit movement of the bearing relative to the pulley shell, e.g., due to vibration or axial loading during use. It may also be desired to prevent the bearings from being contaminated with dust and other particles from the machinery. Contamination of the bearing may cause increased wear and reduced performance.

Accordingly, it is desired to have a device that can be used to hold the bearing in place within the pulley and to prevent contamination of the bearings. It is also further desired that the device be easy to attach to the outer shell of the pulley.

SUMMARY

In an aspect, the invention features a rotatable device including an annular rotatable member having a bore extending therethrough and an outer surface disposed about the bore. A bearing is located in the bore. The bearing is operably connected to the annular rotatable member to form an axis of rotation about which the annular rotatable member can rotate relative to an inner race of the bearing. A combination dust cover and bearing retention member spans the bore at a location spaced axially from the bearing. The cover includes a flange received by a groove extending outwardly from the bore in a direction toward the outer surface of the rotatable member to attach the combination dust cover and bearing retaining member to the rotatable member.

In another aspect, the invention features a pulley includes a pulley body having a bore extending therethrough. The pulley body includes an engaging surface disposed about the bore and a bearing disposed in a bearing receiving portion of the bore. A cover spans the bore at a location spaced axially from the bearing. The cover includes a flange received by a groove extending outwardly from the bore in a direction toward the engaging surface to attach the cover to the pulley body.

In another aspect, the invention features a method of attaching a cover to a pulley for a belt drive system. The pulley includes a pulley body having central bore, a bearing received by the bore and a groove extending outwardly from the bore toward a belt engaging surface of the pulley body. The method includes forming a cover preform having a central portion, a flange preform and a connecting portion connecting the central portion and the flange preform. The flange preform is plastically deformed to form a flange while locating the flange within the groove with the central portion spanning the bore at an axial location spaced from the bearing.

In another aspect, the invention features a combination cover and bearing retaining member preform for a pulley for use in a belt drive system. The pulley includes a pulley body having central bore, a bearing received by the bore and a groove extending outwardly from the bore toward a belt engaging surface of the pulley body. The combination cover and bearing retaining member preform includes a flange preform configured to be plastically deformed to locate the flange preform in the groove of the pulley body with the flange preform seated against the bearing. A central portion of the combination cover and bearing retaining member preform is axially disposed from the flange to span the bore of the pulley body at a location spaced axially from the bearing. A connecting portion of the combination cover and bearing retaining member preform connects the flange and the central portion.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

FIG. 6 is a front view of an embodiment of a pulley along with the combination dust cover and bearing retaining member attached to the pulley;

FIG. 7 is a section view of the pulley along lines 7-7 of FIG. 6;

FIG. 8 is a detail view of the pulley at area 8 of FIG. 7;

FIG. 10 is a front view of an embodiment of a pulley along with another embodiment of a combination dust cover and bearing retaining member preform;

FIG. 11 is a section view of the pulley along lines 11-11 of FIG. 10;

FIG. 12 is a detail view of the pulley at area 12 of FIG. 11;

DETAILED DESCRIPTION

Figure 1:
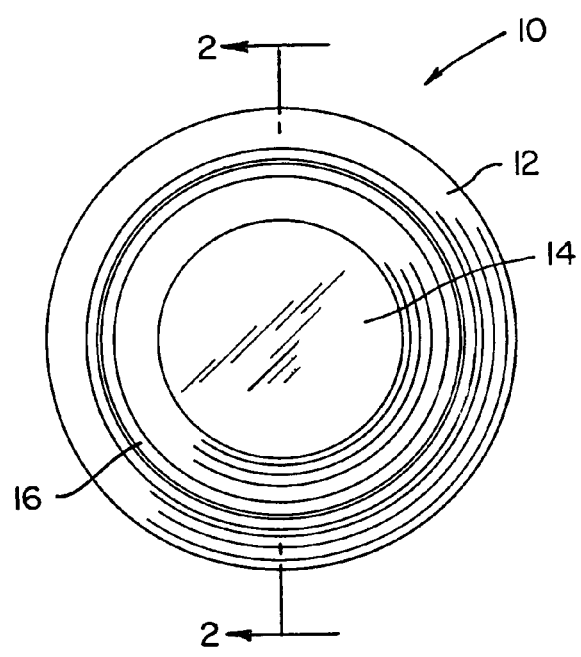
FIG. 1 is a front view of an embodiment of a combination dust cover and bearing retaining member preform.
Figure 2:
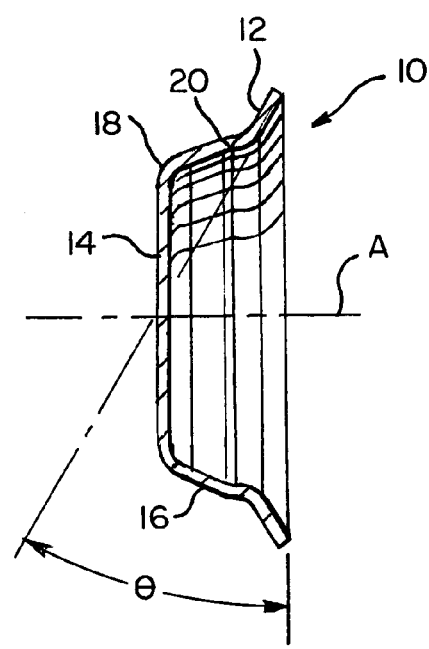
FIG. 2 is a side section view of the combination dust cover and bearing retainer along lines 2-2 of FIG. 1.

Referring to FIGS. 1 and 2, a combination dust cover and bearing retaining member preform 10 includes a flange preform 12, a central portion 14 disposed axially from the flange preform and a connecting portion 16 that connects the flange preform and the central portion. The combination dust cover and bearing retaining member preform 10 is formed such that it can be permanently deformed to form a combination dust cover and bearing retaining member and to attach the combination dust cover and bearing retaining member to a pulley.

As most clearly seen by FIG. 2, the combination dust cover and bearing retaining member preform 10 has a generally U-shaped cross-section with central portion 14 being substantially planar forming a plateau and the connecting portion 16 includes a set of bends 18 and 20 leading to flange preform 12. Flange preform 12 is bent relatively slightly an angle θ (in some embodiments, less than about 45 degrees, such as about 30 degrees) and extends outwardly from the connecting portion 16 (i.e., in a direction away from a central axis A of the combination dust cover and retaining member preform 10).

Combination dust cover and bearing retaining member preform 10 is formed from a unitary piece of material. Any suitable process can be employed to form the combination dust cover and bearing retainer 10 such as stamping. Any suitable, permanently deformable material can be used to form the preform 10 such as aluminum, magnesium, steel and steel alloys including 1008/1010 steel as an example. In some embodiments, the material is coated, such as steel with a galvanized coating (e.g., hot dip galvanized smooth 40/40 or better), which can improve corrosion resistance.

Figure 4:
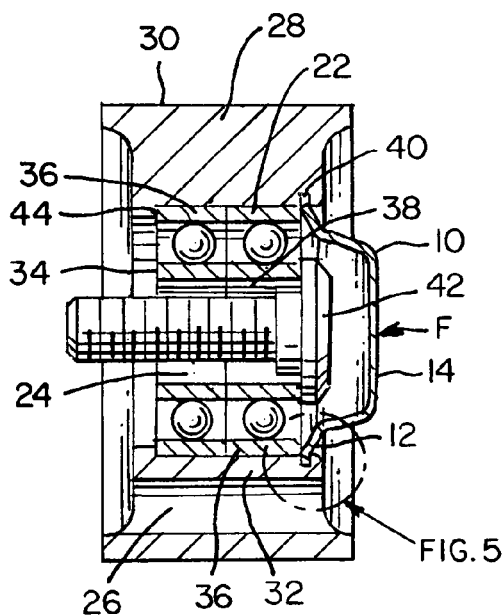
FIG. 4 is a section view of the pulley along lines 4-4 of FIG. 3.
Figure 3:
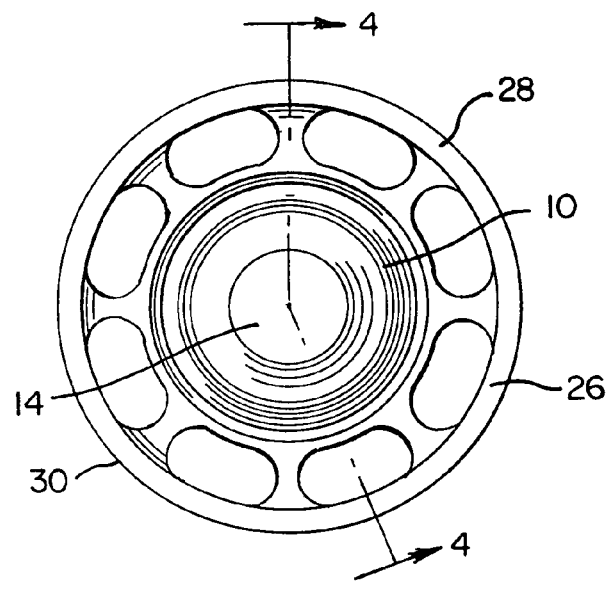
FIG. 3 is a front view of an embodiment of a pulley along with the combination dust cover and bearing retaining member preform of FIG. 1.
Figure 5:
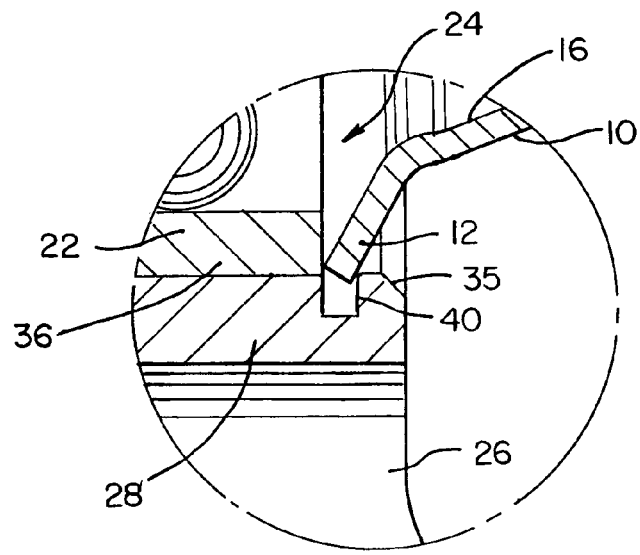
FIG. 5 is a detail view of the pulley at area 5 of FIG. 4.

Referring now to FIGS. 3-5, the combination dust cover and bearing retention member preform 10 is used to retain a bearing 22 in a bore 24 of an idler pulley 26 and to also provide sealing function to inhibit contamination of the bearing, which can reduce the life and performance of the bearing. Pulley 26 includes a pulley body 28 that includes a belt-running surface 30 for engaging a belt, such as an automotive power transmission belt (not shown) and bore 24 extending therethrough to a depth having a bearing retainer portion 32 (FIG. 4) sized to receive bearing 22. Bearing 22 includes an inner race 34, an outer race 36 and an opening 38 (FIG. 4). The bearing 22 is secured within the bearing retainer portion 32 such that the pulley body 28 including the belt-running surface 30 and outer race 36 can rotate together relative to the inner race 34. In some embodiments, bearing 22 is press fit into the bearing retainer portion 32 by inserting the bearing through a mouth 35 of the bore (FIG. 5) and applying an insertion force to the bearing. In some instances, bearing 22 is glue bonded to the bore 24. A positive stop for the bearing assembly can be formed on the throat side of the annular inner retainer portion 32. In some embodiments, there is a positive stop bearing retaining assembly member (not shown) inserted within the bore 24 that receives the bearing 22. A fastener 42 (e.g., a bolt) extends through bore 24 and is used to secure pulley components together as an assemblage with the receiving mounting surface. Other fastening structures can be used, such as radial rivet joints, swage joints, tapered/expansion fit joints, etc.

Extending outwardly from the bore 24, axially adjacent the bearing retainer portion 32 is annular groove 40. Groove 40 is continuous about the bore 24 and is sized and shaped to receive the flange preform 12 of the combination dust cover and bearing retainer preform 10. Groove 40 is positioned to locate flange preform 12 adjacent the bearing 22. Upon insertion of the flange preform 12 into the groove 40, the flange formed during the insertion seats against the outer race 36 of the bearing 22 to retain the bearing between the formed flange 52 (FIG. 8) and a seating surface 44 (FIG. 4) extending inwardly from the bore 24 and located at an end of the bearing 22 opposite the end engaging the formed flange.

Pulley body 28 can be molded, however any other suitable method of forming the pulley body can be used such as machining, casting, stamping, spinning, etc. Suitable materials for forming the pulley body 28 include polymeric materials including thermoplastic and thermosetting materials such as polyamides (e.g., polyphthalamides), nylons (e.g., nylon-6, nylon-6/6, nylon-4/6), polyesters, epoxy resins, phenolic resins, polyurethanes, high density polyolefins (e.g., polyethylene), metals including steel and aluminum and the like. Fillers, modifiers and reinforcing agents may also be used, such as glass fibers.

A force F is applied to the central portion 14 of the combination dust cover and bearing retaining member preform 10 and/or assembly portions 16 and 18 (e.g., by a press) to insert the flange preform 12 into groove 40. In some embodiments, the pulley 26 is first mounted to a mounting surface and the force F is applied in a direction toward the mounting surface. Force F is sufficient to permanently deform the flange preform 12 (e.g., by reducing θ shown by FIG. 2) and to position the flange preform in the groove 40. In some embodiments, force F also permanently deforms the central portion 14 and/or connecting portion 16. To facilitate deformation, the combination dust cover and bearing retaining member preform 10 may include divots, grooves, etc. that extend inwardly from its outer surface.

Referring to FIGS. 6-8, after applying force F, combination dust cover and bearing retaining member 50 is attached to the pulley body 28 of the pulley 26 with flange 52 inserted in groove 40. Flange 52 seats against outer race 36 of bearing 22 to retain the bearing 22 between the flange 52 and seating surface 44. Central portion 14 of the combination dust cover and bearing retaining member 50 has a continuous cross section that spans the bore 24 in multiple directions (see arrows 55 of FIG. 6) at a location axially spaced from the flange 52 and that is further from the bearing 22 and fastener 42 than the flange. Central portion 14 has an inwardly facing surface 54 that is spaced axially from and faces the fastener 42 and an opposite surface 56 that faces away from fastener 42. Central portion 14 is absent of any openings therethrough and the insertion of flange 52 into groove 40 provides a continuous seal about the bore 24 to inhibit contaminates from reaching the bearing 22 through mouth 35.

Figure 9:
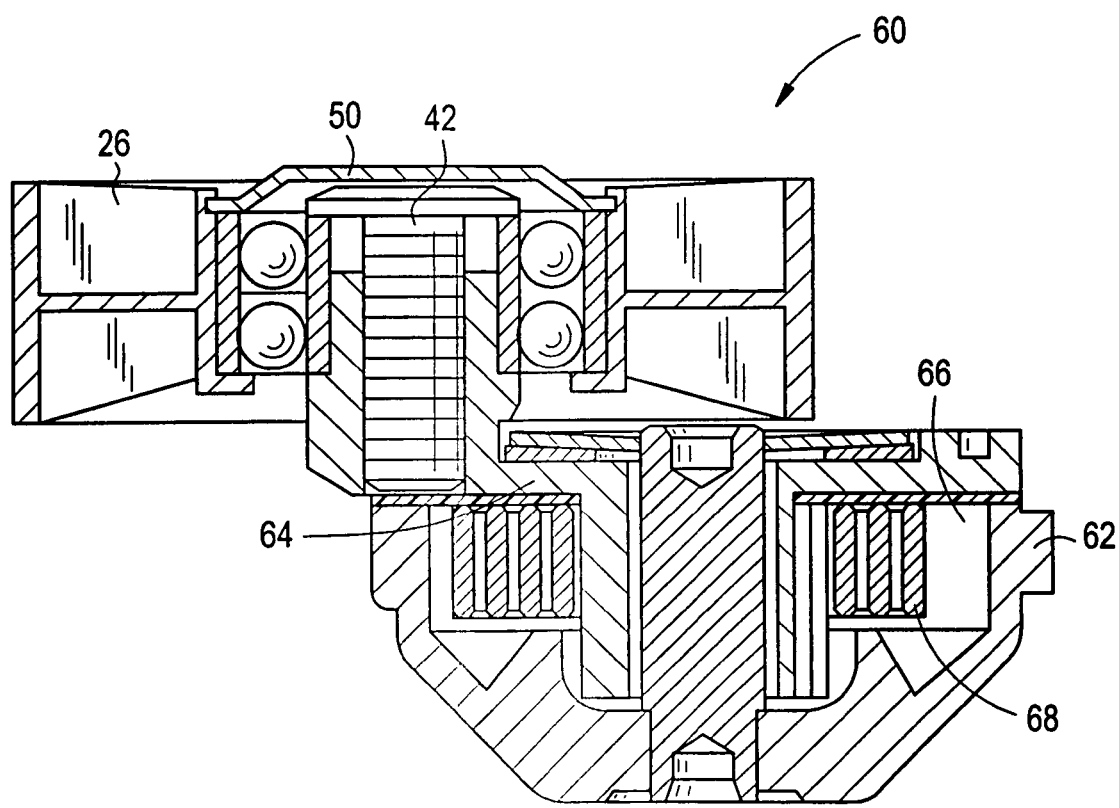
FIG. 9 is a section view of an embodiment of a belt tensioner with the pulley of FIG. 6.

Referring now to FIG. 9, pulley 26 is a back-side idler pulley that can be used as part of a belt tensioner 60. Belt tensioner 60 includes a support housing 62 and a pivot arm 64 rotatably mounted to the support housing to form a spring cavity 66 therebetween. Located within the spring cavity 66 and operatively connected to both the pivot arm 64 and the support housing 62 is a spring 68 (such as a round wire or flat wire spring). The spring 68 applies a force to the pivot arm 64 during use to bias the pivot arm toward an unloaded position. The pivot arm 64 carries the pulley 26, which can rotate relative to the pivot arm. As can be seen by FIG. 9, combination dust cover and bearing retaining member 50 is located on the side of the pulley 26 opposite the pivot arm 64.

Figure 14:
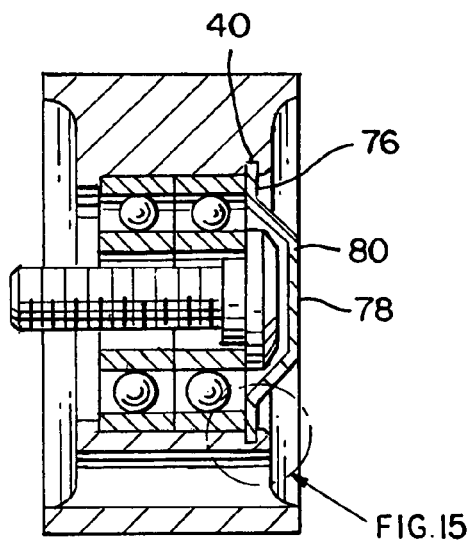
FIG. 14 is a section view of the pulley along lines 14-14 of FIG. 13.
Figure 13:
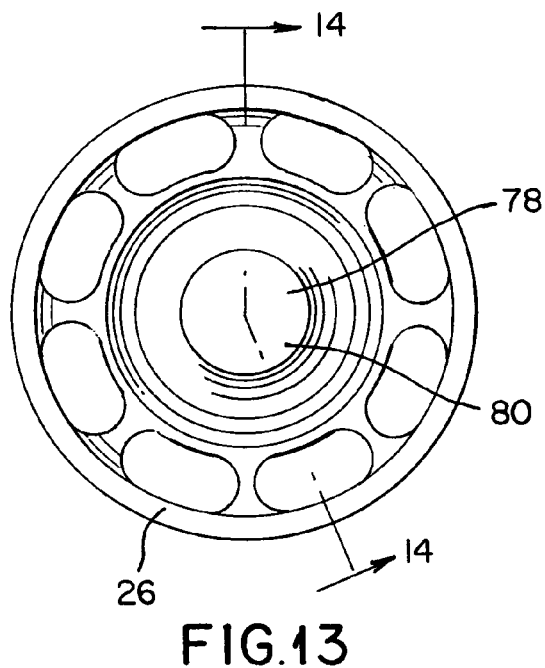
FIG. 13 is a front view of an embodiment of a pulley along with combination dust cover and bearing retaining member attached to the pulley.
Figure 15:
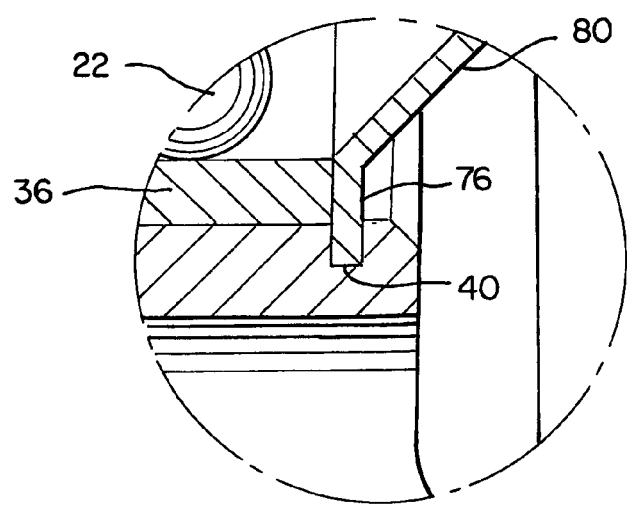
FIG. 15 is a detail view of the pulley at area 15 of FIG. 14.

FIGS. 10-12 show an alternative embodiment of a combination dust cover and bearing retaining member preform 70 that includes a central portion 74 that is dome-shaped, having a relatively arcuate cross-section compared to central portion 14 of the preform 10 shown by FIG. 2. Similar to the process described above, flange preform 72 is inserted into groove 40 of pulley 26 by applying a force F to the arcuate central portion 74. Referring to FIGS. 13-15, after applying the force F, combination dust cover and bearing retaining member 80 is formed, flange 76 is located in the groove 40 and central portion 78 is permanently deformed to have a relatively planar cross-section.

Combination dust cover and bearing retaining members 50, 80 can have several advantages over, for example, a separate snap ring and dust cover assembly. The combination dust cover and bearing retaining member 50, 80 is a single component, which can reduce the cost associated with purchasing separate components. The combination dust cover and bearing retainer 50, 80 can be used independent of secondary glues and can be used with various interference fits between the bearing 22 and the pulley 26. Combination dust cover and bearing retaining member 50, 80 can be attached to the pulley body 28 as described above using currently available press technology, for example, without the difficulty of compressing, locating and releasing a snap ring. The shape of the combination dust cover and bearing retaining member preform 10, 70 deforms to fill in the radial groove 40 by inserting the flange preform 12, 72 therein in response to the force F applied to the central portion 14, 74. The plastic deformation of the combination dust cover and bearing retaining member preform 10, 70 can result in a secure attachment to the pulley body 28 making unintended disassembly of the combination dust cover and bearing retainer 50, 80 from the pulley body difficult. The combination dust cover and bearing retainer preform 10, 70 can be retrofit onto certain existing pulleys that utilize a snap ring arrangement to retain the bearing. Combination dust cover and bearing retaining member 50, 80 can assure the maximum retention force afforded by the material forming the combination dust cover and bearing retaining member because it forms a mechanically interlocks with the groove 40. The combination dust cover and bearing retaining member 50, 80 is free of any openings that can provide contaminant entry locations. Due to plastic deformation of the combination dust cover and bearing retaining member 50, 80, it can accommodate different diameter groove sizes while still forming a seal about the bore 24. Use of the combination dust cover and bearing retaining member 50, 80 can reduce the amount of material and the number of components necessary to achieve both bearing retention and sealing functions, which can reduce cost. Existing idler pulleys, wheels, gears, rollers or other rotating devices can be modified to include a groove that can receive the combination dust cover and bearing retaining member preform 10, 70.

Figure 16:
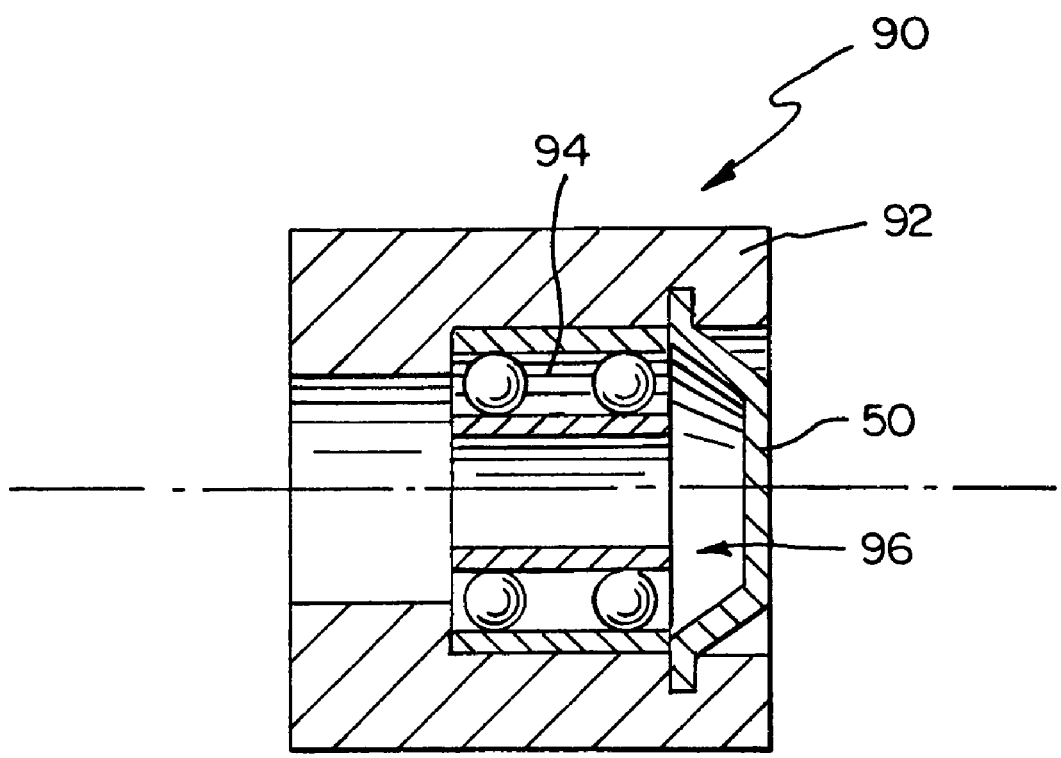
FIG. 16 is a schematic, section view of a rotatable device including a combination dust cover and bearing retaining member.

A number of detailed embodiments have been described. Nevertheless, it will be understood that various modifications may be made. For example, the pulley may be a front-side idler pulley with belt-engaging surface 30 including a profile corresponding to a belt profile. Additionally, the combination dust cover and bearing retaining member can be used with other rotating devices, for example, in certain cases where a snap ring or other similarly functioning retainer could be used to retain a bearing assembly and where it may be desirable to include a dust cover, end cap or other similar containment precluding cover. FIG. 16 schematically illustrates a rotating device 90 including a rotatable member 92 having a bore 96 and outer surface 100 disposed about bore 96. A bearing 94 is located in the bore 96 and a combination dust cover and bearing retaining member 50 both secures the bearing in rotatable member 92 against seating surface 98 and inhibits contamination of the bearing as described above. Accordingly, other embodiments are within the scope of the following claims.

What is claimed is:

1. A rotatable device comprising:
   an annular member having a bore extending therethrough and an outer surface disposed about the bore, the annular member having a preformed groove indented into an inner surface of the bore interior from an open end of the bore;
   a bearing located in the bore, the bearing operably connected to the annular member to form an axis of rotation to allow for relative rotation between the annular member and an inner race of the bearing; and
   a combination dust cover and bearing retaining member spanning the bore at a location spaced axially from the bearing, the combination dust cover and bearing retaining member comprising, in cross-section, a generally U-shaped body having a substantially straight flange connected to a mouth of the U-shaped body and extending outwardly away from the mouth at a first angle, the flange being deformable at its junction to the U-shaped body to move the substantially straight flange to a second angle;
   wherein at the second angle the flange is received in the preformed groove such that the junction is bent to place the substantially straight flange generally perpendicular to the axis of rotation formed by the bearing;
   wherein the substantially straight flange is moved to the second angle in response to an axially directed force applied to the combination dust cover and bearing retainer member to insert the combination dust cover and bearing retaining member into the bore of the annular member and the flange into the preformed groove;
   wherein a portion of the flange seats on a top surface of an outer race of the bearing and the remainder seats in the preformed groove.

2. The rotatable device of claim 1, wherein the bearing seats against a seating surface of the annular member at a side of the bearing opposite a side of the bearing facing the combination dust cover and bearing retaining member.

3. The rotatable device of claim 1, wherein the flange of the combination dust cover and bearing retaining member is friction fit within the groove of the annular member.

4. The rotatable device of claim 1, wherein the combination dust cover and bearing retaining member spans the bore in multiple directions.

5. The rotatable device of claim 1 further comprising a fastener at least partially located in the bore.

6. The rotatable device of claim 5, wherein the-generally U-shaped body includes a central portion that is spaced axially from the fastener.

7. The-rotatable device of claim 1, wherein the-generally U-shaped body and the flange are formed integrally from a single piece of material.

8. The-rotatable device of claim 7, wherein the-generally U-shaped body comprises a metal.

9. The-rotatable device of claim 1, wherein the combination dust cover and bearing retaining member includes a coating.

10. The rotatable device of claim 1, wherein the preformed groove is continuous and endless about the bore.

11. The-rotatable device of claim 1, wherein the combination dust cover and bearing retaining member provides a seal about the bore to inhibit bearing contamination.

12. The rotatable device of claim 1 wherein the annular member is a pulley.

13. The rotatable device of claim 1 wherein the U-shaped body is generally dome-shaped.

14. The rotatable device of claim 13 wherein the dome-shaped body is permanently deformed to have a generally planar cross-section after insertion into the bore of the annular member.

15. A method of attaching a cover to a pulley for a belt drive system, the pulley comprising:
 a pulley body having a central bore and having a preformed groove in an inner surface of the bore extending outwardly from the bore toward a belt engaging surface of the pulley body, the preformed groove being positioned interior from an open end of the bore; and
 a bearing received by the bore and providing an axis of rotation, the bearing comprising an inner race and an outer race with a rotatable member therebetween, the method comprising:
 providing a cover preform comprising, in cross-section, a generally U-shaped body having a substantially straight flange connected to a mouth of the U-shaped body and extending outwardly away from the mouth at a first angle, the flange being deformable at its junction to the U-shaped body to move the substantially straight flange to a second angle;
 inserting the cover preform into the bore of the pulley body with the flange at the first angle; and
 applying an axially directed force to the cover preform in a direction toward the bearing that simultaneously inserts the cover preform into the bore and the flange into the preformed groove;
 wherein inserting the flange into the preformed groove plastically deforms the flange to the second angle such that the junction is bent to position the substantially straight flange generally perpendicular to the axis of rotation;
 wherein the axially directed force applied to the cover preform radially expands the cover preform outward toward the pulley body as it plastically deforms the flange; and
 wherein a portion of the flange seats on a top surface of the outer race of the bearing and the remainder seats in the preformed groove.

16. The method of claim 15 further comprising plastically deforming a central portion of the generally U-shaped body to have a relatively planar cross-section.

17. The method of claim 15 further comprising press fitting the bearing in the bore of the pulley body prior to the step of plastically deforming the flange preform.

18. The method of claim 15 further comprising glue bonding the bearing in the bore of the pulley body prior to the step of plastically deforming the flange preform.

19. The method of claim 15 further comprising mounting the pulley to a mounting surface prior to the step of plastically deforming the flange preform.

20. A kit for a pulley, the kit comprising:
 a pulley body having an axis of rotation and comprising a bore extending therethrough, the bore comprising a preformed groove positioned interior from an entrance thereof;
 a bearing receivable in the bore of the pulley body, the bearing comprising an inner race and an outer race with a rotatable member therebetween; and
 a cover comprising, in cross-section, a generally U-shaped body having a substantially straight flange connected to a mouth of the U-shaped body and extending outwardly away from the mouth at a first angle, the flange being deformable at its junction to the U-shaped body to move the substantially straight flange to a second angle;
 wherein the cover is receivable in the bore of the pulley body with its flange deformed to the second angle such that a portion of the flange seats on a top surface of the outer race of the bearing and the remainder seats in the preformed groove.

21. The kit of claim 20 wherein the bearing is positionable within the bore of the pulley body below but adjacent to the preformed groove.

22. The kit of claim 21 wherein the bearing is press fittable into the bore of the pulley.

* * * * *